T. H. MURPHY.
Machines for Rolling Fabrics.
No. 5,029. Reissued Aug. 6, 1872.
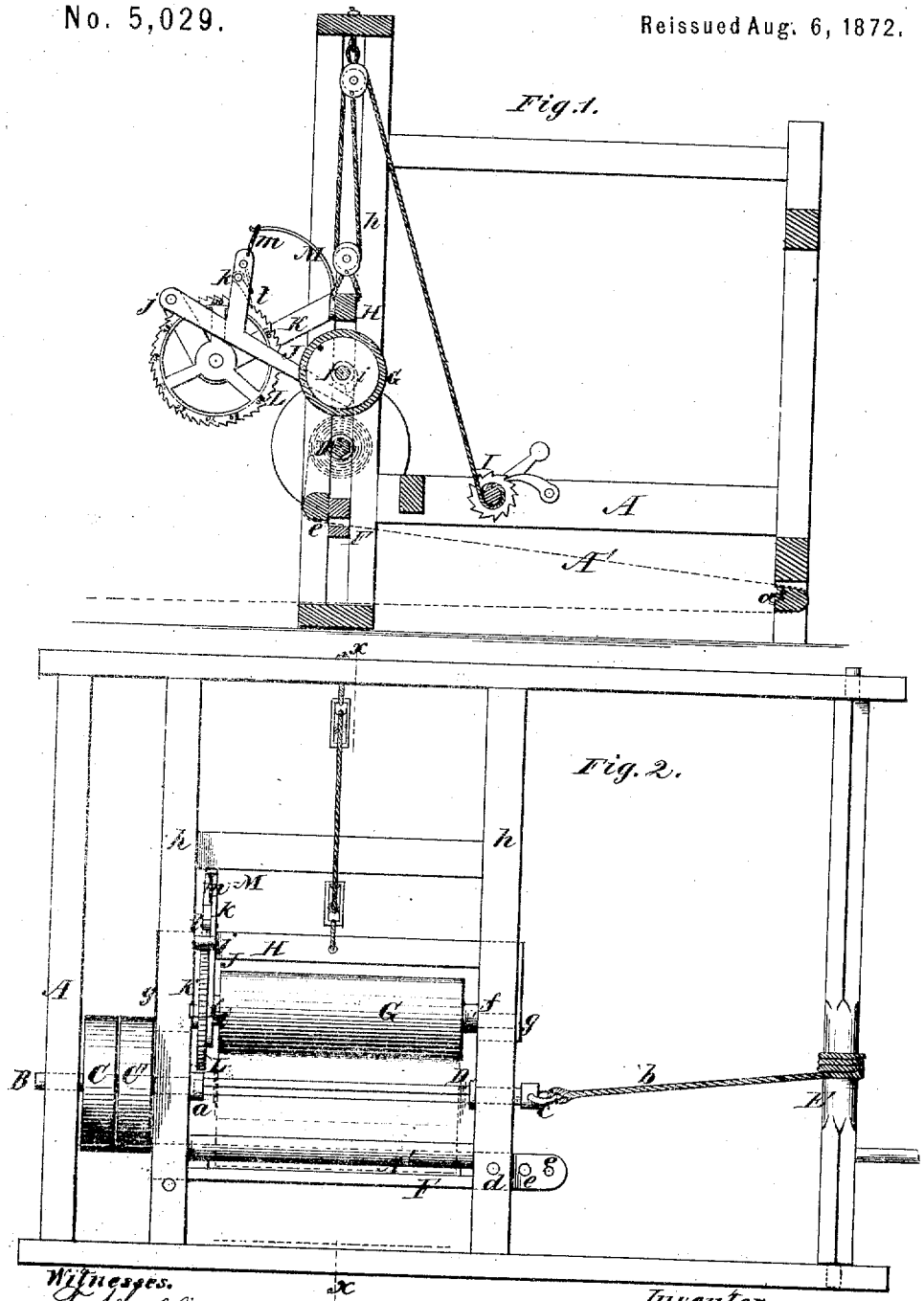
Witnesses.
F. A. Woolley.
Samuel Brock.
Inventor.
Thomas H. Camillus Murphy.

UNITED STATES PATENT OFFICE.

THOMAS H. MURPHY, OF NEW ORLEANS, LOUISIANA.

IMPROVEMENT IN MACHINES FOR ROLLING FABRICS.

Specification forming part of Letters Patent No. 24,046 dated May 17, 1859; reissue No. 5,029, dated August 6, 1872.

*To all whom it may concern:*

Be it known that I, THOMAS H. MURPHY, of the city of New Orleans, in the parish of Orleans and State of Louisiana, have invented a new and useful Machine for Rolling Bagging and Gunny-Cloth Fabrics; and I do hereby declare that the following is a full, clear, and exact description of the same, reference being had to the annexed drawing making part of this specification, in which—

Figure 1 is a vertical central section of my invention taken in the line *x x*, Fig. 2; Fig. 2 is a front view of the same.

Similar letters of reference indicate corresponding parts in the two figures.

To enable those skilled in the art to fully understand and construct my invention, I will proceed to describe it.

A represents a rectangular frame, which may be constructed in any proper way to support the working parts of the device. B is a driving-shaft, which is fitted in one side of the frame A, and has a driving and an idle pulley, C C′, placed on it. The inner end of the shaft B has a hollow square, *a*, formed in it to receive one end of a rolling-shaft, D, which is placed horizontally in the frame A at its lower part. E is a windlass, fitted in the frame A, the rope *b* of the windlass being connected by a hook, *c*, with one end of the rolling-shaft D, as shown clearly in Fig. 2. F is a slotted bar which is placed in the lower part of the frame A below the rolling-shaft D. This bar F may be adjusted longitudinally in the frame A, and secured at any desired point within the range of its movement by a pin, *d*, which may be fitted in either of a series of holes, *e*, (see Fig. 2.) G is a roller, which may be of cast-iron. The journals *f* of this roller are fitted in bearings *g g*, which are attached to a horizontal bar, H. The bearings *g* are fitted in grooves in uprights *h* of the framing, and the roller may be raised, when necessary, by a windlass, I, (see Fig. 1,) the bearings being allowed to slide freely in the uprights *h*. On one of the journals of the roller G a cam, *i*, is placed, the form of which is shown clearly by dotted lines in Fig. 1. J is a lever, the fulcrum *j* of which is at the outer end of a bent bar, K, attached to the framing H, said bar, at its angle, forming the bearing for a toothed wheel, L. The lever J has an arm, *k*, attached to it. Said arm has a pawl, *l*, secured to it, the pawl catching into the wheel L. M is a spring which is attached to the frame H, and is connected, by a cord, *m*, with the arm *k* of the lever J.

The operation is as follows: The bagging A′ or gunny-cloth or fabric to be rolled is passed over a traverse bar, *a*×, of the framing underneath the windlass I, through the slotted guide-bar F, and around the bar D, the roller G bearing on the bagging. Power is applied to the shaft B, and the bagging is wound on the shaft D, the bar F serving as a guide, and insuring the even winding of the bagging or cloth on the roller. The roller G is rotated by the revolution of the shaft D, owing to the pressure of said roller on the bagging or cloth, and at each revolution of said roller the lever J is actuated by the cam *i*, and the wheel L is moved one notch, the pawl *l* actuating the wheel L, which is graduated at one side, and records the revolutions of the roller G. When the piece of bagging or cloth is rolled on the shaft D the latter is withdrawn from the roller by turning the windlass E, and the shaft is again inserted in the frame to receive a succeeding roll. The roller G is elevated and retained at any desired height by the windlass I, so as to admit of the ready removal of the rolls, and the insertion of the shaft D.

This machine has been practically tested, and it operates well, saving a vast deal of labor, and performing the work far better than it can be done by hand.

Having thus described my invention, what I claim as new, and desire to secure by Letters Patent, is—

The rolling or sliding shaft D, in combination with the friction or pressure roller G and windlass E, substantially as and for the purposes hereinbefore set forth.

THOMAS H. MURPHY.

Witnesses:

F. A. WOOLFLEY,

SAMUEL BROCK.